(12) United States Patent
Wang et al.

(10) Patent No.: US 11,919,799 B2
(45) Date of Patent: *Mar. 5, 2024

(54) FINING SUBMERGED COMBUSTION GLASS

(71) Applicant: Owens-Brockway Glass Container Inc., Perrysburg, OH (US)

(72) Inventors: Zhongming Wang, Ypsilanti, MI (US); Earnest Iddings, Sylvania, OH (US); Nicholas A. Schoenrock, Rudolph, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,929

(22) Filed: May 12, 2022

(65) Prior Publication Data

US 2022/0267184 A1 Aug. 25, 2022

Related U.S. Application Data

(63) Continuation of application No. 16/590,076, filed on Oct. 1, 2019, now Pat. No. 11,370,686.

(51) Int. Cl.
  *C03B 5/235* (2006.01)
  *C03B 5/167* (2006.01)
  (Continued)

(52) U.S. Cl.
  CPC .......... *C03B 5/2356* (2013.01); *C03B 5/1672* (2013.01); *C03B 5/225* (2013.01); *C03C 1/004* (2013.01); *C03B 2211/23* (2013.01)

(58) Field of Classification Search
  CPC ... C03B 5/225; C03B 5/2356; C03B 2211/20; C03B 2211/22
  See application file for complete search history.

(56) References Cited

U.S. PATENT DOCUMENTS 3,511,629 A 5/1970 Bauer et al.
3,627,504 A 12/1971 Johnson et al.
(Continued)

FOREIGN PATENT DOCUMENTS

CN 103113022 A 5/2013
CN 103228583 A 7/2013
(Continued)

OTHER PUBLICATIONS

EP Office Action, Application No. 20 793 849.9-1105, Applicant: Owens-Brockway Glass Container Inc., dated Feb. 15, 2023,.
(Continued)

*Primary Examiner* — Cynthia Szewczyk

(57) ABSTRACT

A method of of fining low-density submerged combustion glass includes introducing unfined molten glass produced in a submerged combustion melter into a fining chamber of a fining tank and, further, introducing additive particles into the fining chamber that comprise a glass reactant material and one or more fining agents. The one or more fining agents are released into the molten glass bath upon consumption of the additive particles in the molten glass bath to chemically fine the molten glass bath and the glass reactant material includes one or more materials that integrate into the molten glass bath upon melting. Additionally, the method includes discharging fined molten glass out of the fining chamber of the fining tank. The discharged fined molten glass has a volume percentage of gas bubbles that is less than the volume percentage of gas bubbles in the unfined molten glass introduced into the fining chamber.

17 Claims, 3 Drawing Sheets

(51) Int. Cl.
*C03B 5/225* (2006.01)
*C03C 1/00* (2006.01)

(56) References Cited

U.S. PATENT DOCUMENTS

| | | | |
|---|---|---|---|
| 3,721,540 A * | 3/1973 | Hammer | C03B 5/173 |
| | | | 65/346 |
| 4,004,902 A * | 1/1977 | Pieper | C03B 5/2252 |
| | | | 65/135.4 |
| 4,313,747 A | 2/1982 | Barton | |
| 4,632,687 A * | 12/1986 | Kunkle | C03B 5/14 |
| | | | 65/335 |
| 4,693,740 A | 9/1987 | Noiret et al. | |
| 5,922,097 A * | 7/1999 | Kobayashi | C03B 5/235 |
| | | | 65/134.1 |
| 6,460,376 B1 | 10/2002 | Jeanvoine et al. | |
| 6,519,973 B1 | 2/2003 | Hoke et al. | |
| 6,588,234 B1 * | 7/2003 | Kiefer | C03C 3/091 |
| | | | 65/346 |
| 8,783,067 B2 | 7/2014 | Bauer | |
| 9,096,457 B2 | 8/2015 | Leese et al. | |
| 9,206,071 B2 | 12/2015 | Leese et al. | |
| 9,227,865 B2 | 1/2016 | Shock et al. | |
| 9,598,306 B2 | 3/2017 | Leese et al. | |
| 2002/0092325 A1 | 7/2002 | Muschik et al. | |
| 2008/0187686 A1 | 8/2008 | Rodriquez Cuartas et al. | |
| 2009/0176639 A1 | 7/2009 | Jacques et al. | |
| 2009/0215607 A1 | 8/2009 | Dejneka et al. | |
| 2012/0159991 A1 | 6/2012 | Dejneka et al. | |
| 2013/0239618 A1 * | 9/2013 | Ishikawa | C03B 5/173 |
| | | | 65/347 |
| 2014/0090421 A1 | 4/2014 | Shock et al. | |
| 2014/0144185 A1 | 5/2014 | Shock et al. | |
| 2016/0002091 A1 | 1/2016 | Leese et al. | |
| 2019/0284076 A1 | 9/2019 | Wang et al. | |

FOREIGN PATENT DOCUMENTS

| | | |
|---|---|---|
| EP | 0812809 A | 12/1997 |
| JP | 11035338 A | 2/1999 |
| PT | 966406 E | 11/2001 |
| WO | 2017009117 A1 | 1/2017 |

OTHER PUBLICATIONS

International Search Report and Written Opinion, Serial No. PCT/US2020/053202, Int. Filing Date: Dec. 3, 2020, Applicant: Owens-Brockway Glass Container Inc., dated Dec. 3, 2020.
Columbian Office Action, Application No. NC2022/0018624, Applicant: Owens-Brockway Glass Container Inc., dated Sep. 8, 2023.
Colombia Office Action, Serial No. NC2022/0002980, Applicant: Owens-Brockway Glass Container Inc., dated May 30, 2023.

* cited by examiner

FINING SUBMERGED COMBUSTION GLASS

The present disclosure is directed to the chemical fining of molten glass produced by a submerged combustion melter and, more specifically, to the use of additive particles to introduce a precise quantity of one or more fining agents into a fining tank located downstream of the submerged combustion melter.

BACKGROUND

Many types of glass, and in particular soda-lime-silica glass have long been produced in a Siemens-style continuous melting furnace that is fed with glass feed material formulated to yield a specific glass chemistry and related properties. The glass feed material is fed on top of a large glass melt of a generally constant level contained in a melting chamber of a continuous melting furnace. The glass melt is maintained at a temperature of about 1450° C. or greater so that the added glass feed material can melt, react, and progress through several intermediate melt phases before becoming chemically integrated into the glass melt as the melt moves through the melting chamber of the furnace towards a fining chamber located on the opposite side of a submerged throat. In the fining chamber, bubbles and other gaseous inclusions are removed from the glass to yield chemically homogenized molten glass having the correct chemistry and a commercially acceptable number and size of entrained bubbles (sometimes referred to as "bubble free" glass) as needed for further processing. The heat needed to maintain the glass melt within the melting chamber has conventionally been supplied by overhead burners that combust a mixture of fuel and oxidant within an open combustion zone located above the glass melt. The burners are located in burner ports on opposite sidewalls of the refractory superstructure that partially defines the combustion zone (cross fired furnace) and/or in a back wall of the refractory superstructure (end port fired furnace).

Submerged combustion (SC) melting is a melting technology that has recently become a potentially viable alternative to the glass melting process employed in a conventional Siemens-style continuous melting furnace. Contrary to conventional melting practices, SC melting involves firing a combustible mixture of a fuel and an oxidant directly into a glass melt contained in a melter, typically though submerged burners mounted in the floor or sidewall of the melter. The combustible gas mixture autoignites and the resultant combustion products cause vigorous stirring and turbulence as they are forced through the glass melt. The intense shearing forces cause rapid heat transfer and particle dissolution throughout the molten glass compared to the slower kinetics of a conventional melting furnace in which the molten glass bath is heated primarily with radiant heat. And while SC technology can melt the glass feed material to produce chemically homogenized molten glass relatively quickly, the glass melt contained in the SC is generally a volume of low-density and foamy molten glass that can include anywhere from 30 vol % to 60 vol % of entrained gas bubbles.

The fining of the molten glass discharged from an SC melter is much different than conventional techniques for removing bubbles from a glass melt contained within a Siemens-style conventional melting furnace. For one, the bubbles contained in the glass melt of an SC melter are homogeneously distributed throughout the melt and constitute a significantly higher volumetric proportion of the melt than what is found in either the melting or fining chamber of a Siemens-style furnace. Moreover, when the molten glass discharged from an SC melter is delivered into a downstream fining tank, the large quantity of bubbles entrained in the molten glass may form an insulating foam layer on top of the molten glass bath housed in the fining tank as the larger bubbles quickly ascend to the surface of the glass bath and accumulate. The insulating foam layer can block the transfer of radiant heat into the underlying molten glass bath, which can slow the overall fining process by causing a drop in temperature within the deeper portions of the molten glass bath at the bottom of the fining tank. The incorporation of chemical fining agents into the glass feed material introduced into the SC melter is also a difficult endeavor since the direct firing of combustion gasses through the glass melt may result in excessive volatilization of the fining agents and/or unwanted chemical reactions. Accordingly, fining techniques that are better tailored to SC melting are needed.

SUMMARY OF THE DISCLOSURE

The present disclosure describes a method of fining molten glass that is discharged from a submerged combustion melter along with additive particles that can be used to support the bubble removal process. The disclosed method involves introducing additive particles that include a defined concentration of one or more fining agents into a molten glass bath contained in a fining tank that receives unfined molten glass discharged from an upstream submerged combustion melter. The additive particles comprise a physical mixture of a glass reactant material and the one or more fining agents. This ensures that the delivery of the additive particles to the molten glass bath can supply a precise amount of the fining agent(s) to the glass bath, without disrupting the glass chemistry of the bath, especially since standard material feeding equipment would be generally unable to accurately meter the only the requisite small quantity of the fining agent(s) needed to achieve effective glass fining. The additive particles thus serve as a carrier for the fining agent(s). To that end, the amount of the fining agent(s) added to the molten glass bath of the fining tank can be accurately controlled by controlling the amount of the additive particles introduced into the fining tank.

The present disclosure embodies a number of aspects that can be implemented separately from or in combination with each other to fine foamy molten glass received from a submerged combustion melter. According to one embodiment of the present disclosure, a method of fining low-density submerged combustion glass involves several steps. One step of the method includes providing a fining tank downstream from a submerged combustion melter. The fining tank has a housing that defines a fining chamber and contains a molten glass bath in the fining chamber. The housing further defines each of a glass inlet, a glass outlet, and an auxiliary access passage. Within the fining chamber, the molten glass bath flows in a flow direction from the glass inlet to the glass outlet. Another step of the method includes introducing unfined molten glass produced in the submerged combustion melter into the fining chamber of the fining tank through the glass inlet. The unfined molten glass has a volume percentage of gas bubbles and a density and, upon being introduced into the fining chamber, combines with the molten glass bath. Yet another step of the method includes introducing additive particles into the fining chamber of the fining tank through the auxiliary access passage. The additive particles comprise a glass reactant material and one or more fining agents. The one or more fining agents are released into the molten glass bath upon consumption of the additive particles in the molten glass bath to thereby accelerate the removal of gas bubbles from the molten glass bath. And, still further, another step of the method includes discharging fined molten glass from the glass outlet of the fining tank. The fined molten glass has a volume percentage of gas bubbles that is less than the volume percentage of gas bubbles in the unfined molten glass and further has a density that is greater than the density of the unfined molten glass.

According to another aspect of the present disclosure, a method of fining low-density submerged combustion glass also includes several steps. One step of the method includes producing unfined soda-lime-silica glass in a submerged combustion melter. The soda-lime-silica glass has a glass composition that includes 60 wt % to 80 wt % $SiO_2$, 8 wt % to 18 wt % $Na_2O$, and 5 wt % to 15 wt % CaO. Another step of the method includes introducing the unfined soda-lime-silica glass into a fining tank located downstream of the submerged combustion melter. The fining tank has a housing that contains a molten glass bath comprised of soda-lime-silica glass into which the unfined soda-lime-silica glass introduced into the fining tank is combined. The molten glass bath flows in a flow direction within the fining chamber towards a glass outlet of the fining tank. Yet another step of the method includes introducing additive particles into the fining chamber of the fining tank separately from the unfined molten glass. The additive particles comprise a glass reactant material and one or more fining agents. The one or more fining agents are released into the molten glass bath contained in the fining chamber upon consumption of the additive particles in the molten glass bath to thereby accelerate the removal of entrained gas bubbles from the molten glass bath. Still another step of the method includes discharging fined molten glass from the glass outlet of the fining tank. The fined molten glass has a volume percentage of gas bubbles that is less than a volume percentage of gas bubbles in the unfined molten glass and further has a density that is greater than a density of the unfined molten glass.

According to another aspect of the present disclosure, an additive particle for introduction into a molten glass bath contained in fining chamber of a fining tank located downstream of a submerged combustion melter is defined. The additive particle comprises a physically compacted homogeneous mixture comprising a glass reactant material and one or more fining agents. The one or more fining agents have a concentration within the additive particle that ranges from 1 wt % to 30 wt % based on the total weight of the additive particle. Additionally, the additive particle has a particle size defined by its largest dimension that ranges from 2 mm to 30 mm.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
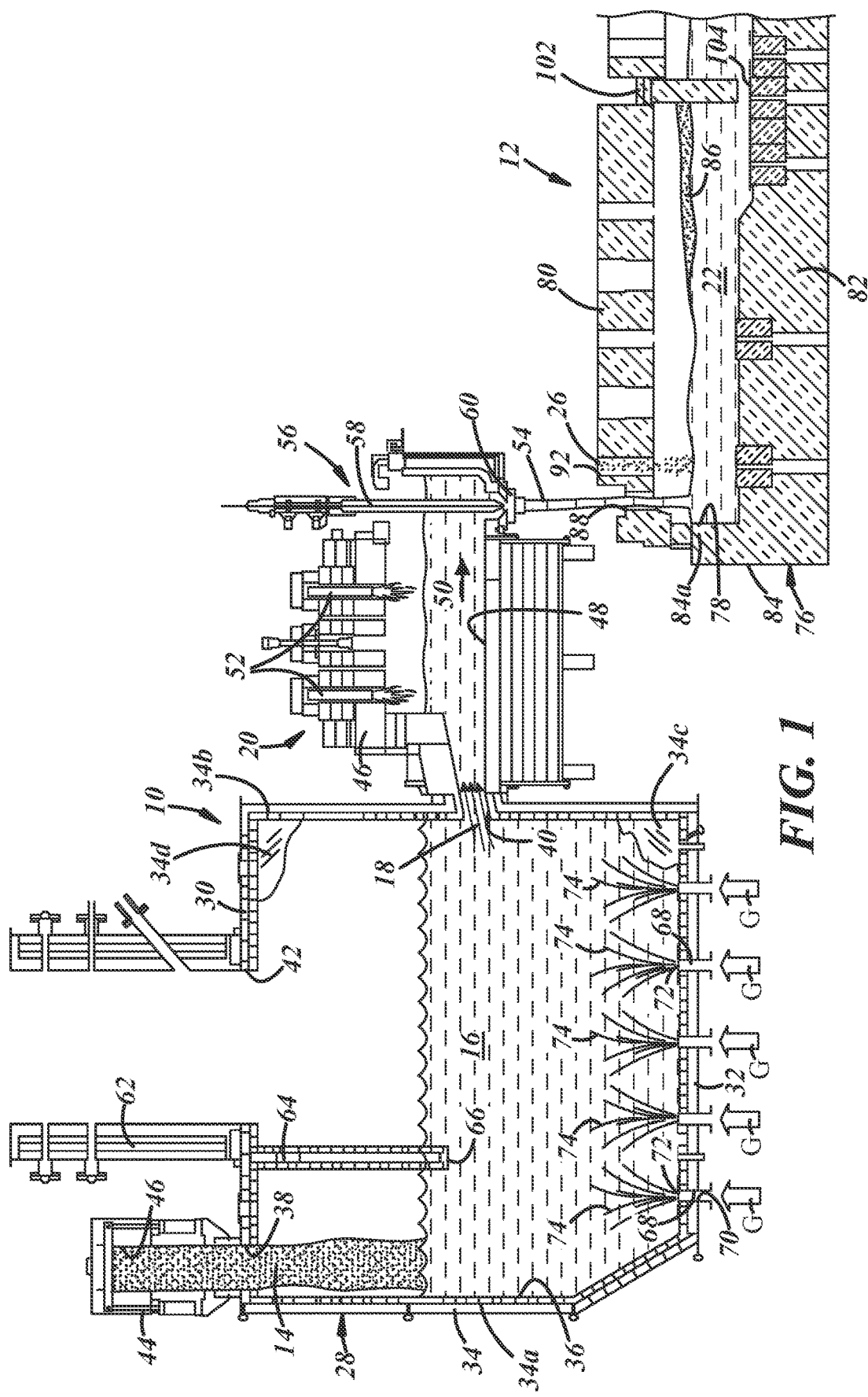
FIG. 1 is an elevated cross-sectional depiction of a submerged combustion melter and a portion of a fining tank located downstream of the submerged combustion melter, and wherein the fining tank is configured to receive molten glass discharged from the submerged combustion melter according to one embodiment of the present disclosure.
Figure 2:
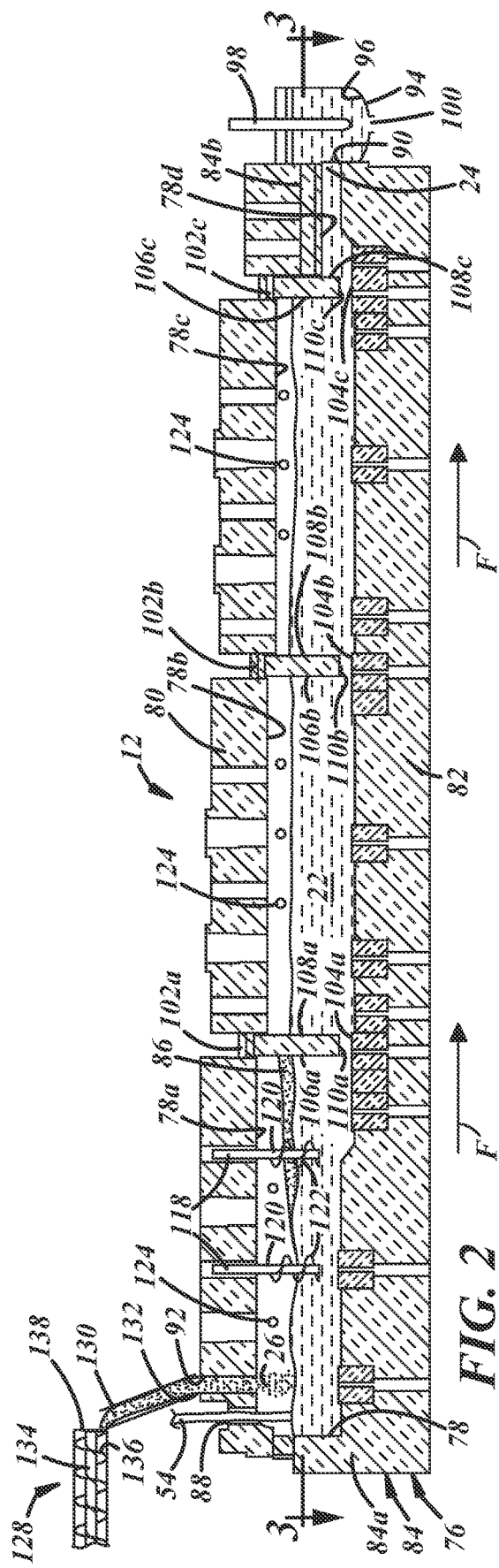
FIG. 2 is an elevated cross-sectional depiction of the fining tank illustrated in FIG. 1 showing the introduction of additive particles into the molten glass bath contained within a fining chamber of the fining tank.
Figure 5:
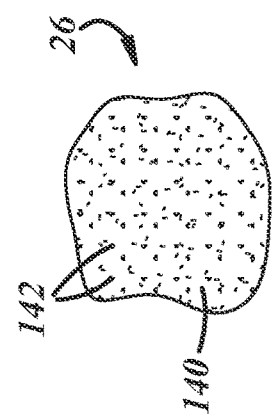
FIG. 5 is representative illustration of an additive particle that includes one or more fining agents dispersed within a glass reactant material according to one embodiment of the present disclosure.

A portion of an overall glass manufacturing operation is shown in FIG. 1 that includes a representative submerged combustion (SC) melter 10 and a fining tank 12 located downstream from the SC melter 10 for purposes of illustrating various aspects of the present disclosure. A glass feed material 14 formulated to melt and react to produce a particular glass chemistry is introduced into the SC melter 10. The glass feed material 14 melts and reacts within the SC melter 10 and becomes chemically integrated into a glass melt 16 contained within the SC melter 10. A portion of the glass melt 16 is discharged from the SC melter 10 as unfined molten glass 18. The unfined molten glass 18 is then delivered to the fining tank 12 either directly or through an intervening stilling vessel 20. The unfined molten glass 18 flows through the fining tank 12 as part of a molten glass bath 22 and bubbles are removed therefrom to produce fined molten glass 24 (FIG. 2) that meets specifications for bubble free glass and is suitable for downstream processing into a finished glass article. To aid in the overall fining of the unfined molten glass 18, one or more chemical fining agents are added into the fining tank 12 by way of additive particles 26 (FIGS. 2 and 5). The additive particles 26 allow a precise and accurate amount of the fining agent(s) to be metered into the fining tank 12 so as to avoid uncontrolled and unpredictable variations in the amount of the fining agent(s) added to the fining tank 12 and the potential consequences of adding too much or too little of the fining agent(s).

The SC melter 10 includes a housing 28 that has a roof 30, a floor 32, and an upstanding wall 34 that connects the roof 30 and the floor 32. The upstanding wall 34 further includes a front end wall 34a, a rear end wall 34b that opposes and is spaced apart from the front end wall 34a, and two opposed lateral sidewalls 34c, 34d that connect the front end wall 34a and the rear end wall 34b. Together, the roof 30, the floor 32, and the upstanding wall 34 define an interior reaction chamber 36 of the melter 10 that contains the glass melt 16 when the melter 10 is operational. Each of the roof 30, the floor 32, and the upstanding wall 34 may be constructed to withstand the high temperature and corrosive nature of the glass melt 16 or the possible effects of being exposed to the internal environment of the interior reaction chamber 36. For example, each of those structures 30, 32, 34 may be a constructed from a refractory material or one or more fluid cooled panels that support an interiorly-disposed refractory material having an in-situ formed frozen glass layer in contact with the glass melt 16.

The housing 28 of the SC melter 10 defines a feed material inlet 38, a molten glass outlet 40, and an exhaust vent 42. Preferably, as shown best in FIG. 1, the feed material inlet 38 is defined in the roof 30 of the housing 28 proximate the front end wall 34a, and the molten glass outlet 40 is defined in the rear end wall 34b of the housing 28 above the floor 32, although other locations for the feed material inlet 38 and the molten glass outlet 40 are certainly possible. The feed material inlet 38 provides an entrance into the interior reaction chamber 36 for the delivery of the glass feed material 14. Indeed, a batch feeder 44 that is configured to introduce a metered amount of the glass feed material 14 into the interior reaction chamber 36 may be coupled the housing 28. And while many designs are possible, the batch feeder 44 may, for example, include a rotating screw (not shown) that rotates within a feed tube 46 of a slightly larger diameter that communicates with the feed material inlet 38 to deliver the glass feed material 14 from a feed hopper into the interior reaction chamber 36 at a controlled flow rate.

The molten glass outlet 40 provides an exit from the interior reaction chamber 36 for the discharge of the unfined molten glass 18 out of the SC melter 10. The unfined molten glass 18 may, as shown, be introduced directly into the stilling vessel 20, if desired. The stilling vessel 20 includes a housing 46 that defines a holding compartment 48. The holding compartment 48 receives the unfined molten glass 18 that is discharged from the interior reaction chamber 36 of the SC melter 10 through the molten glass outlet 40 and maintains a volume 50 of the unfined molten glass 18. One or more impingement or non-impingement burners 52 may be mounted in the housing 46 of the stilling vessel 20 to heat the volume 50 of unfined molten glass and/or suppress or destroy any foam that may accumulate on top of the volume 50 of unfined molten glass. A constant or intermittent flow 54 of the unfined molten glass may be delivered from the volume 50 of unfined molten glass maintained in the holding compartment 48 and out of the stilling vessel 20 by a spout 56 appended to the housing 46. The spout 56 may have a reciprocal plunger 58 that is operable to controllably dispense the flow 54 of unfined molten glass through an orifice plate 60 so that the downstream fining tank 12 receives a controlled input of the unfined molten glass. Of course, in other embodiments, the stilling vessel 20 may be omitted and the unfined molten glass 18 discharged from the interior reaction chamber 36 of the SC melter 10 may be poured or otherwise introduced directly into the fining tank 12.

The exhaust vent 42 is preferably defined in the roof 30 of the housing 28 between the front end wall 34a and the rear end wall 34b at a location downstream from the feed material inlet 38. An exhaust duct 62 communicates with the exhaust vent 42 and is configured to remove gaseous compounds from the interior reaction chamber 36. The gaseous compounds removed through the exhaust duct 62 may be treated, recycled, or otherwise managed away from the SC melter 10 as needed. To help prevent or at least minimize the loss of some of the glass feed material 14 through the exhaust vent 42 as unintentional material castoff, a partition wall 64 that depends from the roof 30 of the housing 28 may be positioned between the feed material inlet 38 and the exhaust vent 42. The partition wall 64 may include a lower free end 66 that is submerged within the glass melt 16, as illustrated, or it may be positioned close to, but above, the glass melt 16. The partition wall 64 may be constructed similarly to the roof 30, the floor 32, and the surrounding upstanding wall 34, but it does not necessarily have to be so constructed.

The SC melter 10 includes one or more submerged burners 68. Each of the one or more submerged burners 68 is mounted in a port 70 defined in the floor 32 (as shown) and/or the surrounding upstanding wall 34 at a location immersed by the glass melt 16. The submerged burner(s) 68 forcibly inject a combustible mixture G of a fuel and an oxidant into the glass melt 16 through an output nozzle 72. The fuel may be methane or propane, and the oxidant may be pure oxygen (≥99 vol % $O_2$), air, or any oxygen rich gas (≥80 vol % $O_2$). Upon being injected into the glass melt 16, the combustible gas mixture G immediately autoignites to produce combustion products 74—namely, $CO_2$, CO, $H_2O$, and any uncombusted fuel, oxygen, and/or other gas compounds such as nitrogen—that are discharged into and through the glass melt 16. Anywhere from five to thirty submerged burners 68 are typically installed in the SC melter 10 although more or less burners 68 may certainly be employed depending on the size and melt capacity of the melter 10. In terms of supplying the submerged burner(s) 68 with the combustible gas mixture G, each of the burner(s) 68 may be fluidly coupled to a fuel manifold and an oxidant manifold by a flow conduit that is equipped with sensors and valves to allow for precise control of the flow rates of the fuel and oxidant to the burner(s) 68 in the correct ratio.

During operation of the SC melter 10, each of the one or more submerged burners 68 individually discharges combustion products 74 directly into and through the glass melt 16. The glass melt 16 is a volume of molten glass that often weighs between 1 US tons (1 US ton=2,000 $lb_m$) and 100 US tons and is generally maintained at a constant volume during steady-state operation of the SC melter 10. As the combustion gasses 74 are thrust into and through the glass melt 16, which create complex flow patterns and severe turbulence, the glass melt 16 is vigorously agitated and experiences rapid heat transfer and intense shearing forces. The combustion products 74 eventually escape the glass melt 16 and are removed from the interior reaction chamber 36 through the exhaust vent 42 along with any other gaseous compounds that may volatize out of the glass melt 16. Additionally, in some circumstances, one or more non-submerged burners (not shown) may be mounted in the roof 30 and/or the surrounding upstanding wall 34 at a location above the glass melt 16 to provide heat to the glass melt 16, either directly by flame impingement or indirectly through radiant heat transfer, and to also facilitate foam suppression and/or destruction.

While the one or more submerged burners 68 are being fired into the glass melt 16, the glass feed material 14 is controllably introduced into the interior reaction chamber 36 through the feed material inlet 38. Unlike the operation of a conventional Siemens-style continuous melting furnace, the glass feed material 14 does not form a batch blanket that rests on top of the glass melt 16; rather, the glass feed material 14 is rapidly disbanded and consumed by the turbulent glass melt 16. The vigorous agitation and shearing forces caused by the submerged burner(s) 68 subjects the glass feed material 14 to intense heat transfer and rapid particle dissolution throughout the glass melt 16. This causes the glass feed material 14 to mix, react, and become chemically integrated into the glass melt 16 relatively quickly. However, the agitation and stirring of the glass melt 16 by the direct discharge of the combustion products 74 also promotes bubble formation within the glass melt 16. Consequently, the glass melt 16 is foamy in nature and includes a homogeneous distribution of about 30 vol % to 60 vol % of entrained gas bubbles. The entrained gas bubbles render the density of the glass melt 16 relatively low, typically ranging from 0.75 $gm/cm^3$ to 1.5 $gm/cm^3$, or more narrowly from 0.99 $gm/cm^3$ to 1.3 $gm/cm^3$, for soda-lime-silica glass, compared to a Siemens-style continuous melting furnace. The gas bubbles entrained within the glass melt 16 vary in size and contain any of several gasses including $CO_2$, $H_2O$ (vapor), $SO_2$, $N_2$, $CH_4$, $H_2S$, CO, $O_2$, and volatile organic compounds (VOCs).

The glass feed material 14 introduced into the interior reaction chamber 36 is formulated to produce molten glass within the glass melt 16 having the desired final glass chemistry. Soda-lime-silica glass, for example, is used extensively to manufacture flat glass articles, such as windows, hollow glass articles including containers such as bottles and jars, as well as tableware and other specialty glass articles. Soda-lime-silica glass comprises a disordered and spatially crosslinked ternary oxide network of $Na_2O$—$CaO$—$SiO_2$. The silica component ($SiO_2$) is the largest oxide by weight and constitutes the primary network forming material of soda-lime-glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass articles more practical and less energy intensive than pure silica glass while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, soda-lime-silica glass may, if desired, include other oxide and non-oxide materials that act as network formers, network modifiers, colorants, decolorants, redox agents, or other agents that affect the properties the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-silica glass besides $SiO_2$, $Na_2O$, and CaO, the sum total of those additional materials is preferably 10 wt % or less, or more narrowly 5 wt % or less, based on the total weight of the soda-lime-silica glass.

When producing soda-lime-silica glass using the SC melter 10, the glass feed material 14 may be a physical mixture of virgin raw materials and optionally cullet (i.e., recycled glass) and/or other glass precursors that provides a source of $SiO_2$, $Na_2O$, and CaO in the correct proportions along with any of the other materials listed above and summarized below in Table 1. The virgin raw materials may include corresponding quantities of quartz sand (crystalline $SiO_2$), soda ash ($Na_2CO_3$), and limestone ($CaCO_3$) as the source of $SiO_2$, $Na_2O$, and CaO in the glass melt 16, respectively. Other virgin raw materials may also be included in the glass feed material 14 to provide a source of one or more of $SiO_2$, $Na_2O$, CaO and possibly other oxide and/or non-oxide materials depending on the chemistry of the soda-lime-silica glass being produced. These other virgin raw materials may include feldspar, dolomite, and calumite slag. The glass feed material 14 may even include up to 80 wt % cullet. Additionally, the glass feed material may include secondary or minor raw materials that provide the soda-lime-silica glass chemical composition with colorants, decolorants, redox agents, and can also provide fining agents if such agents are desired to be introduced into the glass melt 16 to complement the fining agents introduced into the molten glass bath 22 as part of the additive particles 26.

TABLE 1

Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-6 | Magnesite |
| $Li_2O$ | 0-2 | Lithium oxide |
| $K_2O$ | 0-1.5 | Potash |
| $Fe_2O_3$* | 0-0.6 | Contaminant |
| $Cr_2O_3$ | 0-0.2 | Chromium oxide |
| $MnO_2$ | 0-0.2 | Manganese Dioxide |
| $Co_3O_4$ | 0-0.1 | Cobalt oxide |
| $TiO_2$ | 0-0.8 | Titanium oxide/dioxide |
| $SO_3$ | 0-0.2 | Salt Cake, Slag |
| Se | 0-0.1 | Selenium |
| F | 0-0.5 | Contaminant |

*Refers to the total amount of $Fe_2O_3$ and FeO expressed as $Fe_2O_3$

The unfined molten glass 18 discharged from the SC melter 10 through the molten glass outlet 40 is drawn from the glass melt 16 and is chemically homogenized at the desired final glass chemistry. The unfined molten glass 18 is directed into the fining tank 12—with or without first being collected in the holding compartment 48 of the stilling vessel 20—and eventually to additional downstream equipment for further processing into a glass article. With reference now to FIGS. 1-4, the fining tank 12 includes a housing 76 that defines a fining chamber 78. The housing 76 includes a roof 80, a floor 82, and an upstanding wall 84 that connects the roof 80 and the floor 82. The upstanding wall 84, more specifically, includes an inlet end wall 84a, an outlet end wall 84b spaced apart from the inlet end wall 84a in a flow direction F of the flowing molten glass bath 22, and two opposed lateral sidewalls 84c, 84d that connect the inlet end wall 84a and the outlet end wall 84b. A floating layer of foam 86 may develop in the molten glass bath 22. The terms "fining" and "fine" as used in connection with the fining tank 12 and its operation are intended to be read broadly to encompass all types of bubble removal mechanisms including by thermal management of the molten glass bath 22 and by reactions of chemical fining agent(s) within the glass bath 22.

The housing 76 of the fining tank 12 defines a glass inlet 88, a glass outlet 90, and an auxiliary access passage 92 through which the additive particles 26 are introduced into the fining chamber 78 for consumption by the molten glass bath 22. The glass inlet 88 may be defined in the roof 80 of the housing 76 proximate the inlet end wall 84a, as shown for example in FIGS. 1-2 and 4, or it can be defined in the inlet end wall 84a either above or below a surface of the molten glass bath 22. The glass inlet 88 provides an entrance to the fining chamber 78 for the introduction of the unfined molten glass 18, 54 discharged from the SC melter 10 either directly or via the stilling vessel 20. The unfined molten glass 18 may be piped or poured into the fining chamber 78 through the glass inlet 88. In that regard, the molten glass outlet 40 of the SC melter 10 and the glass inlet 88 of the fining tank 12 may be mechanically connected by a continuous flow conduit, or, as shown here, the molten glass outlet 40 and the glass inlet 88 may be mechanically unconnected yet in flow communication with each other since a fully-enclosed conduit having a contained flow path does not extend entirely from the spout 56 of the stilling vessel 20 to the housing 76 of the fining tank 12.

The glass outlet 90 may be defined in the outlet end wall 84b of the housing 76 adjacent to the floor 82, as shown for example in FIG. 2, or it can be defined in the floor 82 proximate the outlet end wall 84b. The glass outlet 90 provides an exit from the fining chamber 78 for the discharge of the fined molten glass 24 (FIG. 2) out of the fining tank 12 for further processing. For example, as part of the overall production of glass containers, the fined molten glass 24 discharged from the fining tank 12 may be transferred into a spout 94 appended to the fining tank 12. The spout 94 collects the fined molten glass 24 in a spout bowl 96 and includes at least one reciprocal plunger 98 that reciprocates to control the flow of the fined molten glass 24 through an orifice plate 100 to fashion streams or runners (not shown) of the fined molten glass. The streams or runners of the fined molten glass may be sheared into molten glass gobs of a predetermined weight that can be subsequently formed into glass containers as will be described in more detail below.

Positioned between the glass inlet 88 and the glass outlet 90 within the fining chamber 78 may be one or more partition walls 102 that extend downwardly from the roof 80 towards the floor 82 to define, together with corresponding portions of the floor 82 and the sidewalls 84c, 84d of the upstanding wall 84, a submerged passageway 104. If more than one partition wall 102 is present, the walls 102 are serially positioned and spaced apart in the flow direction F of the molten glass bath 22. Here, three partition walls are depicted between the inlet end wall 84a and the outlet end wall 84b relative to the flow direction F of the molten glass bath 22: (1) a first partition wall 102a providing a first submerged passageway 104a; (2) a second partition wall 102b providing a second submerged passageway 104b; and (3) a third partition wall 102c providing a third submerged passageway 104c; however, it is understood that the number of partition walls 102 could vary, such that more than or less than three partition walls 102 could be utilized. The partition wall(s) 102 are preferably constructed from a heat and corrosion resistant materials, many of which are commercially available, including a refractory material such as bonded AZS (with 20 wt % ZrO).

Figure 3:
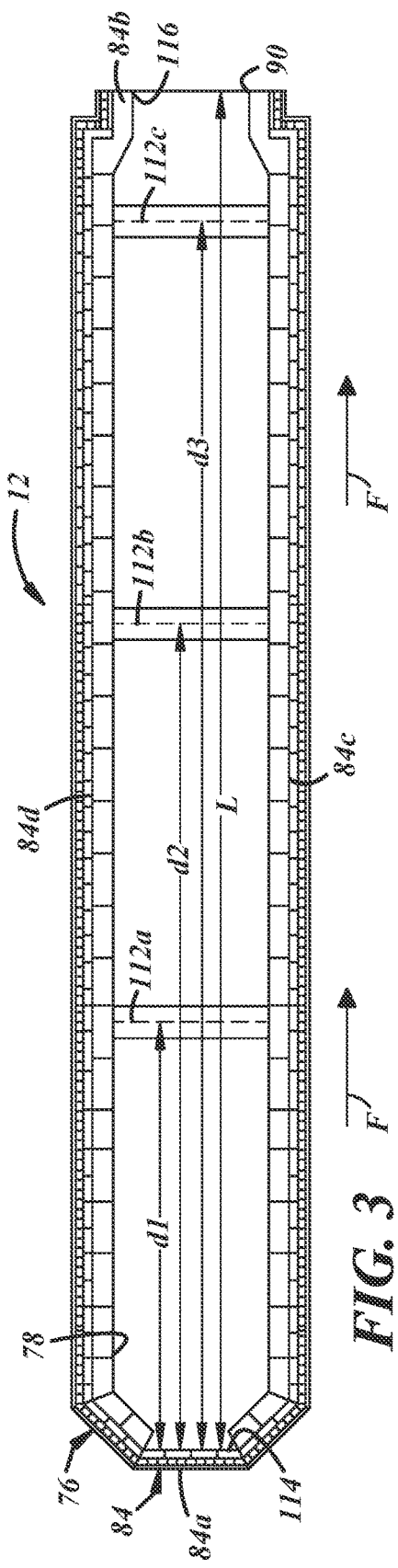
FIG. 3 is a cross-sectional plan view of the fining tank illustrated in FIG. 2 taken along section line 3-3.
Figure 4:
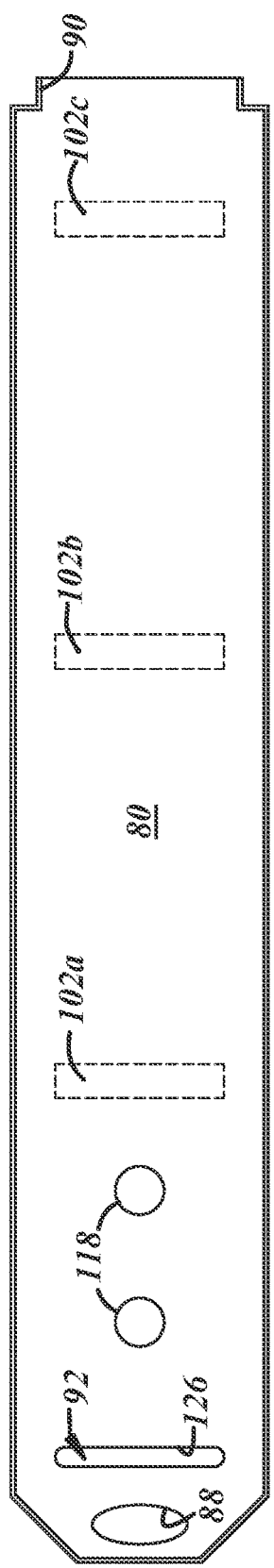
FIG. 4 is a plan view of the roof of the fining tank illustrated in FIG. 2 depicting the auxiliary access passage through which the additive particles that contain one or more fining agents are delivered into the fining tank.

Each of the partition walls 102 includes a front face 106, a back face 108, and a free edge 110 defining a thickness of the wall 102 between the front and back faces 106, 108. These features of the three partition walls 102a, 102b, 102c shown in FIGS. 2-4 are identified with their respective "a," "b," and "c" designations. The free edge 110 of each partition wall 102 is submerged into the molten glass bath 22 and is separated from the floor 82 of the housing 76 by a distance that ranges from 2 inches to 10 inches at a centerplane 112 of the wall 102. The magnitude of the distance separating the free edge 110 of the wall 102 and the floor 82 affects the cross-sectional area of the submerged passageway 104 and, thus, can influence the flow path and flow speed of the molten glass bath 22 through the passageway 104 and within the fining chamber 78. Additionally, it has been determined that a smaller distance between the free edge 110 of the partition wall 102 and the floor 82 results in better distribution of the fining agents carried by the additive particles 26 throughout a depth of the molten glass bath 22 downstream of the partition wall 102.

As shown in this embodiment, the three partition walls 102a, 102b, 102c divide the fining chamber 78 into four sequential zones. Situated between the inlet end wall 84a and the first partition wall 102a is a glass receiving zone 78a. Situated between the first partition wall 102a and the second partition wall 102b is an upstream fining zone 78b and situated between the second partition wall 102b and the third partition wall 102c is a downstream fining zone 78c. Finally, situated between the third partition wall 102c and the outlet end wall 84b is a glass delivery zone 78d. And while the sizes of the several zones 78a, 78b, 78c, 78d may vary, the first partition wall 102a is preferably positioned a distance d1 (FIG. 3) from the inlet end wall 84a—the distance d1 being measured from an inner surface 114 of the inlet end wall 84a to the centerplane 112a of the first partition wall 102a—that ranges from 20% to 45% of a length L of the fining chamber 78. Likewise, the second partition wall 102b and the third partition wall 102c are preferably positioned a distance d2, d3 from the inlet end wall 84a (measured the same as the first partition wall 102a) that ranges from 35% to 60% and from 70% to 90%, respectively, of the length L of the fining chamber 78. The length L of the fining chamber 78 as used here is defined as the distance from the inner surface 114 of the inlet end wall 84a (beginning at the intersection between the inlet end wall 84a and the floor 82) and extending at the same elevation to an end 116 of the floor 82 at the outlet end wall 84b.

The fining tank 12 may include one or more optional stirrers 118 disposed within the glass receiving zone 78a of the fining chamber 78 for agitating the molten glass bath 22 and mixing the additive particles 26 into the molten glass bath 22. Anywhere from one to five and, more preferably, one to three stirrers 118 may be disposed in this zone 78a. The stirrer(s) 118 may be of any suitable construction. For example, as shown here in FIG. 2, each of the stirrers 118 may be an auger blade agitator that includes a rotatable shaft 120 and a coil blade 122 helically wound about an exterior of the rotatable shaft 120. The rotatable shaft 120 extends downward from the roof 80 of the housing 76 so that the coil blade 122 is fully or partially immersed in the molten glass bath 22. The rotatable shaft 120 can be driven by any conventional motor (not shown) and, when rotated, turns the coil blade 122 to induce an axial flow pattern in the molten glass bath 22 in the surrounding vicinity of the blade 122. Of course, other stirrers may also be employed besides the auger blade agitator including, for example, stirrers that include a rotatable blade similar to the one utilized in the auger blade agitator but with a propeller, impeller, or turbine blade as opposed to a coil blade. The upstream fining zone 78b, the downstream fining zone 78c, and the glass delivery zone 78d are preferably free from mechanical stirrers. Indeed, and regardless if there are more than or less than three partition walls 120, the fining tank 12 may be devoid of stirrers downstream of the glass receiving zone 78a.

The fining tank 12 may also include one or more heat emitting devices 124 mounted in the housing 76 above the molten glass bath 22 in each of the zones 78a, 78b, 78c, 78d of the fining chamber 78. The heat emitting device(s) 124 may be burners and/or submerged electrode boosters. Preferably, as shown here in FIG. 2, each of the glass receiving zone 78a, the upstream fining zone 78b, the downstream fining zone 78c, and the glass delivery zone 78d includes one or more burners mounted in the roof 80 or the opposed lateral sidewalls 84c, 84d (depicted here) at a location above the surface of the molten glass bath 22. These burners may be impingement burners whose combustion products are directed towards and make contact with the molten glass bath 22, or they may be non-impingement burners whose flames do not make direct contact with the molten glass bath but nonetheless still radiantly transfer heat to the glass bath 22 as is the case with conventional roof-mounted flat flame burners and wall mounted pencil burners. The heat emitting devices 124 are operated to control a temperature range Ta, Tb, Tc, Td of the molten glass bath 22 within their respective zones 78a, 78b, 78c, 78d as needed to complete the overall fining process. These various temperature ranges may overlap but, in general, satisfy the relationships Ta<Tb, Tb>Tc>Td, and Ta>Td. For example, when the molten glass bath 22 is comprised of soda-lime-silica glass, the preferred temperatures ranges Ta, Tb, Tc, Td of the molten glass bath 22 within each zone 78a, 78b, 78c, 78d of the fining chamber 78 as needed to achieve the requisite glass viscosity in that zone 78a, 78b, 78c, 78d is listed below in Table 2.

TABLE 2

Molten Glass Bath Temperature Ranges

| Zone | Temperature Range (° C.) |
| --- | --- |
| Glass Receiving (78a) | 1100-1400 |
| Upstream Fining (78b) | 1200-1450 |
| Downstream Fining (78c) | 1200-1400 |
| Glass Delivery (78d) | 1000-1250 |

The auxiliary access passage 92 is defined in the housing 76 within the glass receiving zone 78a of the fining chamber 78. The auxiliary access passage 92 serves as an entrance into the fining chamber 78, which is separate from the glass inlet 88, for a feed of the additive particles 26. In one implementation, the auxiliary access passage 92 may be an elongated slot 126 that is defined in the roof 80 of the housing 76. The elongated slot 126 may be extend vertically through the roof 80 or at an angle through the roof 80, and it may further be oriented transverse to the flow direction F of the molten glass bath 22, as shown best in FIG. 4, so that a curtain of the additive particles 26 can be distributed evenly across and into the glass bath 22. Alternatively, the auxiliary access passage 92 could also be a plurality of openings grouped together and extending across the roof 80 transverse to the flow direction F of the molten glass bath 22 to achieve a similar functionality as the elongated slot 126. A particulate feeder 128 may be used to meter a feed of the additive particles 26 into the fining chamber 78 and, more particularly, the glass receiving zone 78a of the fining chamber 78 through the auxiliary access passage 92. For instance, as shown in FIG. 2, the particulate feeder 128 may include a guide chute 130 having an exit 132 in feeding communication with the auxiliary access passage 92 as well as an extruder 134 that delivers a controlled quantity of the additive particles 26 to the guide chute 134 by rotating a screw 136 within a feed tube 138 of a slightly larger diameter to move additive particles 26 axially through the feed tube 138 and eventually into the guide chute 130 at a selected mass flow rate.

The additive particles 26 introduced through the auxiliary access passage 92 are shown generically in FIG. 5 and comprise a physical mixture of a glass reactant material 140 and one or more fining agents 142. The glass reactant material 140 serves as a carrier for the fining agent(s) 142 and is composed of one or more materials that are chemically integratable within the molten glass bath 22. The glass reactant material 140 is chemically integratable in that at least 95 wt %, and preferably 100 wt %, of the glass reactant material 140 is composed of one or more materials that, upon introduction into the molten glass bath 22, produce one or more of the glass chemical components that are already present in the glass bath 22. For example, if the molten glass bath 22 is comprised of soda-lime-silica molten glass, at least 95 wt % of the glass reactant material 140 of the additive particles 26 is composed of one or more materials that melt and react within the molten glass bath 22 to produce any of the chemical components set forth in Table 1 above including $SiO_2$, $Na_2O$, $CaO$, and/or $Al_2O_3$. In that regard, the glass reactant material 140 may be the same composition as the glass feed material 14 introduced into the SC melter 10. Alternatively, the glass reactant material 140 may include sodium silicate, or it may include 5 wt % to 90 wt % sodium silicate and 10 wt % to 95 wt % of the glass feed material.

The one or more chemical fining agent(s) 142 are compounds that can facilitate bubble removal in the molten glass bath 22 by decomposing into fining gasses such as oxygen and sulfur oxides, vaporizing, reacting with gasses and/or other compounds in the glass melt 22, or by some other mechanism. Several types of suitable fining agents include sulfates such as sodium sulfate (i.e., salt cake) and barium sulfate, carbon, nitrates, carbonates, metal oxides such as $MnO_2$, $As_2O_5$, $Sb_2O_5$, $SnO_2$, $BaO$, $PbO$, $Cr_2O_3$, $WO_3$, $Li_2O$, reactive metals such as aluminum, copper, and tin, nitrides, carbides, and water vapor. The concentration of the one or more fining agents 142 in the additive particles 26 may range from 1 wt % to 30 wt % or, more narrowly, from 5 wt % to 10 wt % based on a total weight of the additive particles 26, with the glass reactant material 140 preferably constituting the remainder. The fining agent(s) 142 and the glass reactant material 140 are preferably homogeneously physically mixed together within the additive particles 26 although a heterogeneous physical mixture is certainly acceptable.

Due to the dynamics of submerged combustion melting and the composition of the gasses entrained within the unfined molten glass 18 as bubbles of various sizes, the fining agent(s) 142 preferably include an oxygen scavenging reactive metal. Specifically, in one particular implementation, the one or more fining agent(s) 142 may include or consist entirely of aluminum. Aluminum is a functional and practical oxygen-scavenging fining agent because it reacts with $H_2O$ vapor and $CO_2$—both of which are prevalent in the undissolved gasses of the unfined molten glass 18 and thus the molten glass bath 22—in the environment of the molten glass bath 22 as shown in chemical reactions (1) and (2) below:

$$2Al + 3H_2O_{(V)} \rightarrow Al_2O_3 + 3H_2 \quad (1)$$

$$4Al + 3CO_2 \rightarrow 2Al_2O_3 + 3C \quad (2)$$

As can be seen, aluminum reacts with $H_2O$ vapor to produce $Al_2O_3$ and $H_2$ (reaction 1), and reacts with $CO_2$ to produce $Al_2O_3$ and carbon (reaction 2). These reactions promote bubble removal in the molten glass bath 22 because $H_2$ diffuses more easily through and out of the molten glass bath 22 than $H_2O$ vapor, and the carbon can be absorbed into the glass matrix, form secondary products such as SiC, or be slowly oxidized into CO.

The reactions of aluminum with $H_2O$ vapor and $CO_2$ within the molten glass bath 22 also produce $Al_2O_3$. The in-situ synthesis of $Al_2O_3$ is not necessarily a concern since $Al_2O_3$ is oftentimes purposefully included in the glass composition, especially for soda-lime-silica glass chemistries, to improve the durability of glass network. The ingredients and formulation of the glass feed material 14 may be adjusted, if necessary, to compensate for the aluminum initiated production of $Al_2O_3$ in the molten glass bath 22 of the fining tank 12. In addition to $Al_2O_3$ (reactions 1 and 2) and carbon (reaction 2), aluminum may react within the environment of the molten glass bath 22 to produce other compounds as well. Notably, aluminum may react with $Fe_2O_3$ and $SO_3$ as shown in chemical reactions (3) and (4) below to produce FeO and $SO_2$:

$$2Al + 3Fe_2O_3 \rightarrow Al_2O_3 + 6FeO \quad (3)$$

$$2Al + 3SO_3 \rightarrow Al_2O_3 + 3SO_2 \quad (4)$$

Again, and depending on the desired chemistry and properties (e.g., color) of the glass, the ingredients and formulation of the glass feed material 14 may be adjusted as needed to account for any changes in the color, glass redox value ($Fe^{2+}/(Fe^{2+}+Fe^{3+})$), or other properties of the molten glass bath 22 as a result of adding aluminum into the glass bath 22.

The additive particles 26 can be prepared by a conventional compaction technique. This technique involves, first, weighing the glass reactant material 140 and the one or more fining agents 142 and mixing the materials 140, 142 together in a ball mill or other device to provide a powder mixture. The resultant powder mixture is preferably comprised of powder particles having an average particle size between 30 µm and 60 µm. Water is then added to the powder mixture to form a slurry. The slurry is then transferred to a pressing die and compacted at a pressure of, for example, 5,000 lbs to 80,000 lbs, for several seconds to wring out any non-chemically bound water and to produce a compacted green preform of the desired shape. Next, the compacted green preform is heated in an annealing oven or other heating device, preferably at a temperature of 35° C. to 315° C., until the preform is dry. The preform is then broken apart and sieved to capture additive particles 26 of a select size such as, for example, particles with a largest particle dimension that ranges from 5 mm to 30 mm. The additive particles 26 with their known and consistent concentration of the one or more fining agents 142 may then be packaged or stored until needed for charging into the feeder 128 at the fining tank 12.

The operation of the fining tank 12 aims to remove bubbles (e.g., blisters and seeds) from the molten glass bath 22 so that the fined molten glass 24 discharged from the fining tank 12 is serviceable to form glass articles that do not contain more than a commercially-acceptable amount of visual glass imperfections. During operation of the fining tank 12, the unfined molten glass 18, 54 is introduced into the glass receiving zone 78a of the fining chamber 78 through the glass inlet 88. The unfined molten glass 18, 54 blends with the molten glass bath 22 in the glass receiving zone 78a. The molten glass bath 22 is a flowing volume of molten glass and, accordingly, over time, molten glass flows from the glass receiving zone 78a to the upstream fining zone 78b via the first submerged passageway 104a, then from the upstream fining zone 78b to the downstream fining zone 78c via the second submerged passageway 104b, and finally from the downstream fining zone 78c to the glass delivery zone 78d via the third submerged passageway 104c. Each of the zones 78a, 78b, 78c, 78d of the fining chamber 78 contributes to fining and/or thermal conditioning of the molten glass bath 22 to attain the fined molten glass 24 that is pulled from the molten glass bath 22 in the glass delivery zone 78d of the fining chamber 78 and discharged from the fining tank 12.

The molten glass bath 22 is chemically fined using the fining agent(s) 142 carried by the additive particles 26. As discussed above, the additive particles 26 are introduced into the glass receiving zone 78a upstream of the first partition wall 102a through the auxiliary access passage 92. The additive particles 26 are engulfed and consumed by the molten glass bath 22 thereby releasing the fining agent(s) 142 into the glass bath 22 as the glass reactant material 140 is assimilated into the glass matrix. The fining agent(s) 142 disperse within the molten glass bath 22—a process that is assisted by the axial flow patterns induced by the stirrer(s) 118 if the stirrer(s) 118 are employed—and accelerate the removal of entrained gas bubbles when present within the glass bath 22 at a predetermined concentration. The predetermined average concentration of the fining agent(s) 142 in the molten glass bath 22 can be achieved by calculating and adding the quantity of the additive particles 26 into the glass bath 22 that is needed to achieve the predetermined average concentration given the known concentration of the fining agent(s) 142 in the additive particles and the weight of the glass bath 22. In many instances, and depending on a variety of factors, the predetermined average concentration of the fining agent(s) 142 in the molten glass bath 22 is chosen to range from 5 wt % to 10 wt % based on the total weight of the glass bath 22.

In addition to the chemical fining activity, which occurs primarily in the glass receiving zone 78a and the upstream fining zone 78b as the quantity of the fining agent(s) 142 tends to drop in each of the first three zones 78a, 78b, 78c of the fining chamber 78 while being depleted in the final zone 78d, the molten glass bath 22 is also thermally fined within the fining chamber 78 to speed the ascension of entrained gas bubbles. Such thermal fining involves heating the molten glass bath 22 in the glass receiving zone 78a and the upstream fining zone 78b to decrease the viscosity of the glass melt 22 in those zones 78a, 78b, which in turn increases the rate of bubble ascension out of the glass bath 22 according to Stokes Law. As explained above, the glass receiving zone 78a and the upstream fining zone 78b of the fining chamber 78 may be maintained at temperatures of 1100° C. to 1400° C. and 1200° C. to 1450° C., respectively, for soda-lime-silica glass. The temperature of the molten glass bath 22 may then be reduced in the downstream fining zone 78c and the glass delivery zone 78d to thermally homogenize the molten glass and arrive at a glass viscosity that is more suitable for downstream forming operations. The downstream fining zone 78c and the glass receiving zone 78d may, as explained above, be maintained at temperatures of 1200° C. to 1400° C. and 1000° C. to 1250° C., respectively, for soda-lime-silica glass.

As a result of the fining process that occurs in the fining tank 12, the fined molten glass 24 discharged from the fining tank 12 has fewer bubbles as a percentage of volume than the unfined molten glass 18, 54 feed to the fining tank 12 and, as a result, the density of the fined molten glass 24 is greater than the density of the unfined molten glass 18, 54. In particular, and as applicable to soda-lime-silica glass, the unfined molten glass 18, 54 usually includes a volume percentage of gas bubbles ranging from 30 vol % to 60 vol % and a density ranging from 0.75 gm/cm³ to 1.5 gm/cm³, or more narrowly from 0.99 gm/cm³ to 1.3 gm/cm³, whereas the fined molten glass 24 discharged from the fining tank 12 usually has a volume percentage of gas bubbles below 0.1 vol %, or more narrowly below 0.05 vol %, and a density ranging from 2.3 gm/cm$^3$ to 2.5 gm/cm$^3$. The fined molten glass 24 exiting the fining tank 12 may then be further processed downstream of the tank 12. For instance, and as will be further explained below, the fined molten glass 24 may have a soda-lime-silica chemistry and be formed into glass containers such as, for example, food and beverage bottles and jars, or it may be formed into flat glass products such as windows, or still further it may be formed into tableware or other glass articles.

Figure 6:
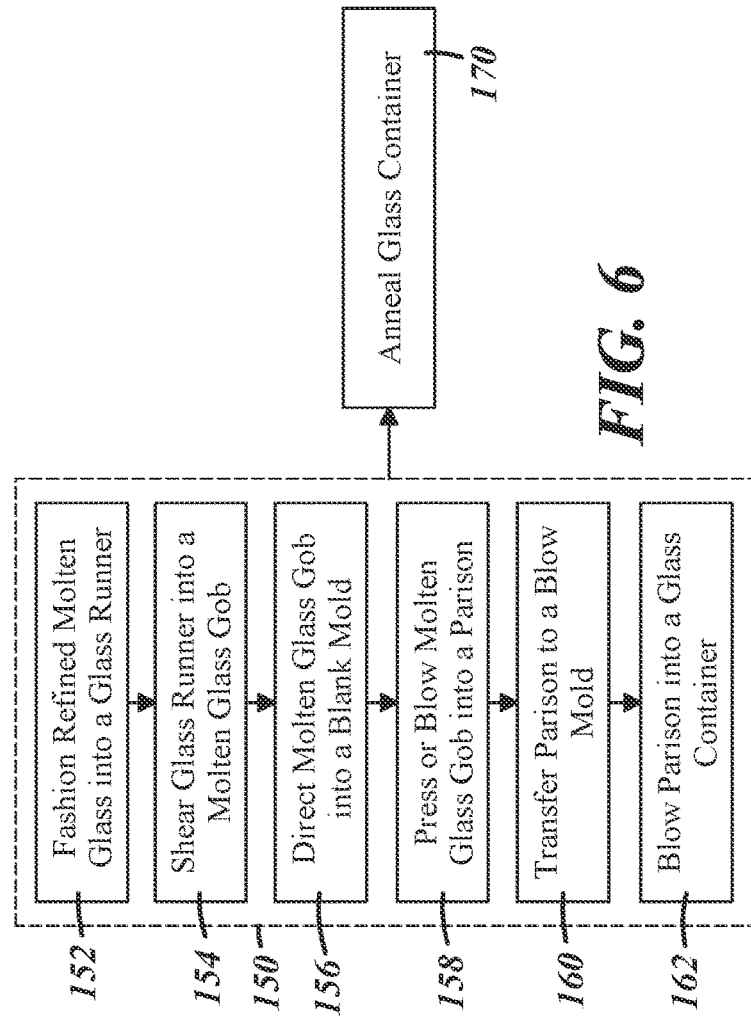
FIG. 6 is a schematic flow diagram of a process for forming glass containers from the fined molten glass discharged from the fining tank according to one embodiment of the present disclosure.

Glass containers may be formed from the fined molten glass 24 exiting the fining chamber 78 in a forming process 150 as summarized in FIG. 6. In the described process 150, the fined molten glass 24 is passed through the spout 94 and fashioned into a stream or runner (not shown) of the fined molten glass in step 152. The streams or runners of the fined molten glass are sheared at the exit of the spout 94 into molten glass gobs of a predetermined weight in step 154. Each molten glass gob is delivered via a gob delivery system into a blank mold of an individual section container forming machine in step 156. In other alternative processes, however, the fined molten glass 24 may be streamed directly from the glass outlet 90 of the fining tank 14 into the blank mold to fill the mold with glass. Once in the blank mold, and with its temperature still between 1000° C. and 1250° C., the molten glass gob is pressed or blown in step 158 into a parison or preform that includes a tubular wall. The parison is then transferred from the blank mold into a blow mold of the individual section forming machine in step 160 for final shaping into a container. Then, in step 162, and once the parison is received in the blow mold, the blow mold is closed and the parison is rapidly outwardly blown into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The glass container formed within the blow mold has an axially closed base and a circumferential wall. The circumferential wall extends from the axially closed base to a mouth that defines an opening to a containment space defined by the axially closed base and the circumferential wall. The glass container is allowed to cool while in contact with the mold walls of the blow mold and is then removed from the blow mold and placed on a conveyor or other transport device. At that point, and in an annealing process 170 that follows the forming process 150, the glass container is annealed. This may involve first reheating the glass container and then cooling the container at a controlled rate in an annealing lehr to relax thermally-induced constraints and remove internal stress points within the containers. For example, during annealing, the glass container may be heated to a temperature above the annealing point of the soda-lime-silica glass, which usually lies within the range of 500° C. to 700° C., followed by slowly cooling the container at a rate of 2° C./min to 5° C./min to a temperature below the strain point of the soda-lime-silica glass, which typically lies within the range of 400° C. to 600° C. The glass container may be cooled rapidly after it has been cooled to a temperature below the strain point. Moreover, any of a variety of coatings may be applied to the surface of the glass container either before (hot-end coatings) or after (cold-end coatings) annealing for a variety of reasons.

There thus has been disclosed a method of fining low-density, foamy, unfined molten glass discharged from a submerged combustion melter that satisfies one or more of the objects and aims previously set forth. The resultant fined molten glass may be further processed into glass articles including, for example, glass containers such as bottles and jars. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of fining low-density submerged combustion glass, the method comprising:

providing a fining tank having a housing that defines a fining chamber as well as a glass inlet and a glass outlet, the fining chamber containing a molten glass bath therein that flows in a flow direction from the glass inlet to the glass outlet, and wherein the fining tank further includes a first partition wall, a second partition wall, and a third partition wall, each of the first, second, and third partition walls extending downwardly from a roof of the housing towards a floor of the housing to define, together with corresponding portions of the floor and opposed sidewalls of the housing, a first submerged passageway, a second submerged passageway, and a third submerged passageway, respectively, the first partition wall and an inlet end wall of the housing located proximate the glass inlet defining a glass receiving zone of the fining chamber, the second partition wall being positioned downstream of the first partition wall in the flow direction of the molten glass bath to define an upstream fining zone of the fining chamber in conjunction with the first partition wall, and the third partition wall being positioned downstream of the second partition wall in the flow direction of the molten glass bath to define a downstream fining zone of the fining chamber in conjunction with the second partition wall and a glass delivery zone of the fining chamber with an outlet end wall of the housing located proximate the glass outlet;

introducing unfined molten glass produced in a submerged combustion melter into the fining chamber of the fining tank;

introducing additive particles into the molten glass bath in the fining chamber of the fining tank, the additive particles comprising a mixture of a glass reactant material and one or more fining agents, the one or more fining agents being released into the molten glass bath upon consumption of the additive particles in the molten glass bath to chemically fine the molten glass bath, and the glass reactant material comprising one or more materials that integrate into the molten glass bath upon melting, each of the unfined molten glass and the additive particles being introduced into the glass receiving zone of the fining chamber; and discharging fined molten glass out of the fining chamber of the fining tank through the glass outlet, the fined molten glass having a volume percentage of gas bubbles that is less than the volume percentage of gas bubbles in the unfined molten glass introduced into the fining chamber.

2. The method set forth in claim 1, wherein the additive particles include a concentration of the one or more fining agents that ranges from 1 wt % to 30 wt %.

3. The method set forth in claim 2, wherein the one or more fining agents contained in the additive particles includes at least one of sulfates, carbon, nitrates, carbonates, metal oxides, reactive metals, nitrides, carbides, or water vapor.

4. The method set forth in claim 1, wherein the one or more fining agents contained in the additive particles includes at least one of sodium sulfate or carbon.

5. The method set forth in claim 1, wherein the glass reactant material comprises at least one of crystalline $SiO_2$, $Na_2CO_3$, or $CaCO_3$.

6. The method set forth in claim 5, wherein the glass reactant material further comprises cullet.

7. The method set forth in claim 1, wherein the glass reactant material comprises sodium silicate.

8. The method set forth in claim 7, wherein the glass reactant material further comprises at least one of crystalline $SiO_2$, $Na_2CO_3$, $CaCO_3$, or cullet.

9. The method set forth in claim 1, wherein the fining tank further includes one or more heat emitting devices that heat the molten glass bath within the glass receiving zone of the fining chamber.

10. The method as set forth in claim 1, wherein the first partition wall is positioned a distance from the inlet end wall that ranges from 20% to 45% of a length of the fining chamber of the fining tank.

11. The method set forth in claim 1, further comprising:
mixing together the glass reactant material and the one or more fining agents to provide a powder mixture;
adding water to the powder mixture to form a slurry;
compacting the slurry to produce a compacted green form;
heating the compacted green form to dry the preform;
breaking the dried compacted preform to form the additive particles.

12. The method set forth in claim 11, further comprising:
capturing additive particles of a select particle size.

13. The method set forth in claim 1, wherein the unfined molten glass is introduced into the fining chamber of the fining tank through the glass inlet, and wherein the additive particles are introduced into the fining chamber of the fining tank through an auxiliary access passage that is defined in the housing of the fining tank and is separate from the glass inlet.

14. A method of fining low-density submerged combustion glass, the method comprising:
providing a fining tank having a housing that defines a fining chamber as well as a glass inlet and a glass outlet, the fining chamber containing a molten glass bath therein that flows in a flow direction from the glass inlet to the glass outlet and which is comprised of soda-lime-silica glass, and wherein the fining tank further includes a first partition wall, a second partition wall, and a third partition wall, each of the first, second, and third partition walls extending downwardly from a roof of the housing towards a floor of the housing to define, together with corresponding portions of the floor and opposed sidewalls of the housing, a first submerged passageway, a second submerged passageway, and a third submerged passageway, respectively, the first partition wall and an inlet end wall of the housing located proximate the glass inlet defining a glass receiving zone of the fining chamber, the second partition wall being positioned downstream of the first partition wall in the flow direction of the molten glass bath to define an upstream fining zone of the fining chamber in conjunction with the first partition wall, and the third partition wall being positioned downstream of the second partition wall in the flow direction of the molten glass bath to define a downstream fining zone of the fining chamber in conjunction with the second partition wall and a glass delivery zone of the fining chamber with an outlet end wall of the housing located proximate the glass outlet;
producing unfined soda-lime-silica glass in a submerged combustion melter, the soda-lime-silica glass having a glass chemical composition that includes 60 wt % to 80 wt % $SiO_2$, 8 wt % to 18 wt % $Na_2O$, and 5 wt % to 15 wt % CaO;
introducing the unfined soda-lime-silica glass into the fining tank located downstream of the submerged combustion melter, the unfined soda-lime-silica glass being introduced into, and combined with, the molten glass bath in the fining chamber of the fining tank;
introducing additive particles into the molten glass bath in the fining chamber of the fining tank, the additive particles comprising a mixture of a glass reactant material and one or more fining agents, the one or more fining agents being released into the molten glass bath upon consumption of the additive particles in the molten glass bath to chemically fine the molten glass bath, and the glass reactant material comprising one or more materials that integrate into the molten glass bath upon melting, each of the unfined soda-lime-silica glass and the additive particles being introduced into the glass receiving zone of the fining chamber; and
discharging fined molten glass out of the fining chamber of the fining tank through the glass outlet, the fined molten glass having a volume percentage of gas bubbles that is less than a volume percentage of gas bubbles in the unfined molten glass that is introduced into the fining chamber.

15. The method set forth in claim 14, wherein the one or more fining agents contained in the additive particles includes at least one of sodium sulfate or carbon.

16. The method set forth in claim 15, wherein the glass reactant material includes at least one of crystalline $SiO_2$, $Na_2CO_3$, $CaCO_3$, sodium silicate, or cullet.

17. The method set forth in claim 14, wherein the fining tank further includes one or more heat emitting devices that heat the molten glass bath within the glass receiving zone of the fining chamber.

* * * * *